United States Patent
Nakamura et al.

[11] Patent Number: 5,963,366
[45] Date of Patent: Oct. 5, 1999

[54] FOCUS DETECTION UNIT AND MICROSCOPE USING THE FOCUS DETECTION UNIT

[75] Inventors: Taizo Nakamura; Yasushi Fukumoto; Yuwu Zhang, all of Kawasaki, Japan

[73] Assignee: Mitutoyo Corporation, Kawasaki, Japan

[21] Appl. No.: 08/965,527

[22] Filed: Nov. 6, 1997

[30] Foreign Application Priority Data

Nov. 11, 1996 [JP] Japan .................................. 8-298454

[51] Int. Cl.⁶ ............................. G02B 21/06; G02B 23/06
[52] U.S. Cl. ....................... 359/389; 359/385; 250/201.3
[58] Field of Search .................................. 359/368, 383, 359/385–390, 232, 233, 471–472, 482; 351/207, 210, 211, 214, 221, 237, 243; 250/201.2–201.8

[56] References Cited

U.S. PATENT DOCUMENTS

| | | | |
|---|---|---|---|
| 4,406,526 | 9/1983 | Smith | 359/388 |
| 4,734,570 | 3/1988 | Horikawa et al. | 250/201.4 |
| 4,798,948 | 1/1989 | Neumann et al. | 250/201.3 |
| 5,317,142 | 5/1994 | Noda et al. | 250/201.3 |

FOREIGN PATENT DOCUMENTS 1-304414 12/1989 Japan .
4-20910 1/1992 Japan .

OTHER PUBLICATIONS

English Abstract of Japanese reference No. 1–304414.
English Abstract of Japanese reference No. 4–20910.

*Primary Examiner*—Thong Nguyen
*Attorney, Agent, or Firm*—Oliff & Berridge, PLC

[57] ABSTRACT

A focus detection unit including an optical system employing an image sandwiching method is disclosed. In the focus detection unit, a double slit mask (12) forming double sight lines is disposed on the optical axis of a lamp 10 while a single slit mask (16) forming an single sight line is disposed on the optical axis of a lamp (14). A triangular pole prism 18 is provided, consisting of first and second side surfaces, which together constitutes an edge, and a plane opposing the edge. The prism (18) is disposed such that the double and single sight line are able to irradiate the first and second side surfaces. The prism reflects the incoming lines toward a plane before the right-angle edge. Before the edge of the prism (18), a projection lens (20) is provided for forming images of the double and single sight lines which have been reflected by the prism (18) and separated by a mask (22), at a both aiming line imaging position 100. The images are projected onto a workpiece.

12 Claims, 8 Drawing Sheets

**LINE SENSOR POSITION DETECTION
(FOCUSED STATE)**

( $\ell_2 = \ell_3$ )

**LINE SENSOR POSITION DETECTION
(DISPLACED FOCUS 1)**

**LINE SENSOR POSITION DETECTION
(DISPLACED FOCUS 2)**

FOCUS DETECTION UNIT AND MICROSCOPE USING THE FOCUS DETECTION UNIT

BACKGROUND OF THE INVENTION

1. Field of the Invention

The present invention relates to a focus detection unit and to a microscope comprising the focus detection unit. This focus detection unit employs a distinguishing image sandwiching method.

2. Description of the Related Art

Means for achieving accurate and reliable detection of optical instrument focus has long been studied. In an example case where a measurement microscope is manually adjusted to focus on the surface of an object and that microscope has a low magnification with generally low detection accuracy due to deep depth of focus, either an ocular or an objective having a large numerical aperture (NA) for high magnification are generally used to increase the magnification of the microscope or to reduce the depth of focus.

In order to achieve more reliable focusing, a method for image split has recently been employed. This method is performed using a split prism such as is shown in FIG. 9.

The optical system of a reflected illumination microscope employing this method incorporates a target 72 and a split prism 70, which together constitute an accurate focusing mechanism. This method is based on the optical principle that the upper and lower split images of a target are sharply shown without displacement between each other in the middle of the sharp image of a workpiece when focus is properly adjusted and that they are shown horizontally displaced when focusing is not properly adjusted. That is, for focus adjustment in this method, whether a vertical line in the image of a target appears straight (position 200) or horizontally displaced (position 202) is observed instead of examining a blur condition of the image surface of a workpiece. With this method, more accurate focusing than conventional methods is achieved as this method has nothing to do with the depth of focus of the objective 76 and, moreover, utilizes matching error recognition which human eyes are more sensitive than to two-point recognition.

However, split prisms used for this method have complicated structures, and accordingly have a large size in order to cover the entire workpiece. This not only creates a sliding vertical line in the center of a target image, but also makes it difficult to correct an out-of-focused state (the position 202).

In order to solve the above problems, an image sandwiching method has also been proposed. In this method, a single line sandwiched by two other lines is utilized for focusing. Focusing accuracy is higher with this method than with the image split method. For example, matching accuracy by naked eye at 250 mm was measured to show that separate angles at 250 mm can be recognized with an accuracy of ±5 seconds and ±6.5 μm using the image sandwiching method, and with ±8 seconds and ±10 μm using the image split method.

A conventional optical system using the image sandwiching method will be described referring to FIG. 10.

Light from a light source 80 proceeding along its optical axis is half-reflected by a half reflection mirror 82 and then converged by a lens 86 and sent through a double slit mask 90 so that double sight lines are formed. The sight lines then pass through a projection lens 94 and proceeding to a mask 91, which masks the lower half of the passing light. The upper half the light passes through the mask 91 and is reflected by a full reflection mirror 84. Light from the light source 80 passing through the half reflection mirror 82 is meanwhile reflected by full reflection mirror 84 and converged by a lens 87. This light then passes through a single slit mask 92 to form a single sight line. The line then passes through a projection lens 96, proceeding to a mask 93. As the upper half of the passing light is shielded by the mask 93, only the lower half passes through the mask 93, and is half-reflected by another half reflection mirror 82. With this arrangement, images are formed in which the single sight line is sandwiched by the double sight lines.

In this image sandwiching method, however, the whole system has a complicated structure including two optical systems, and adjustment thereof is thus troublesome.

Various other automatic focusing devices have been proposed. They typically employ a method in which light from light emitting elements is reflected at the surface of a workpiece; the reflected light is received by light receiving elements; and whether a workpiece is positioned either closer or further with respect to a focal point is determined based on the received light.

In such a method, however, the condition of the surface of a workpiece is likely to influence focusing accuracy, as light from light emitting elements is reflected at the surface. Even more troublesome, a focused state cannot be observed by the naked eye.

SUMMARY OF THE INVENTION

The present invention has been conceived to overcome the above problems and aims to provide a focus detection unit capable of highly accurate detection, including an optical system of a simple structure employing an image sandwiching method, and a microscope employing such a focal detection unit.

In order to achieve the above object, a focal detection unit and a microscope having that unit have following characteristic points.

(1) The invention comprises a focus detection unit for focusing by forming images of double sight lines and an image of a single sight line on an image surface of an optical system of a microscope, projecting these sight line onto a workpiece, and adjusting them such that the image of the single sight line is sandwiched by the images of the double sight lines. Such a focus effection unit comprises a first light source; a double slit mask provided on an optical axis of the first light source, for forming the double sight lines; a second light source; a single slit mask provided on an optical axis of the second light source, for forming the single sight line; a prism shaped in a triangle pole having a first side surface and a second side surface together constituting an edge of a predetermined angle, and a plane opposing to the edge, for reflecting the double sight lines irradiating the first side surface and the single sight line irradiating the second side surface, toward before the edge, and a projection lens provided before the edge of the prism, for forming the images of the double sight lines and the image of the single sight line so as to project them onto the workpiece.

According to the above, an optical system having a simple structure can be constructed because a prism to separate the double and single lines for the image sandwiching method is used. A simple structure optical system, which can be easily adjusted enables the focus detection unit to be compact. In addition, improved focusing accuracy can be achieved with a conventional microscope including a TV camera for TV images when the above focus detection unit is simply attached where the TV port's location.

(2) A microscope according to this invention comprises a focus detection unit as described above in (1); and an objective for forming the images of the double sight lines and the image of the single sight line formed by the projection lens on an image surface of the workpiece.

Since the above microscope employs an image sandwiching method enabling highly accurate naked eye detection, improved manual focusing accuracy can be achieved in focusing this microscope. Also, the use of a prism enables simplifying the structure of an optical system, which allows easy adjustment of the optical system.

(3) Another microscope according to this invention includes a focus detection unit for focusing by forming images of double sight lines and an image of a single sight line on an image surface of an optical system of a microscope, projecting the images onto a workpiece, and adjusting the images such that the image of the single sight line image is sandwiched by the image of the double sight lines.

Such a microscope comprises a first light source; a double slit mask provided on an optical axis of the first light source for forming the double sight lines; a second light source; a single slit mask provided on an optical axis of the second light source, for forming the single sight line; a prism shaped in a triangle pole having a first side surface and a second side surface together constituting an edge of a predetermined angle, and a plane opposing to the edge, for reflecting the double sight lines irradiating the first side surface and the single sight line irradiating the second side surface, toward point before the edge; a projection lens provided before the edge of the prism, for forming the images of the double sight lines and the image of the single sight line so as to project them onto the workpiece; a full reflection mirror for reflecting in a direction of a predetermined angle the images of the double sight lines and the image of the single sight line formed by the projection lens; a half reflection mirror for half-reflecting the images of the double sight lines and the image of the single sight line reflected by the full reflection mirror; and an objective for forming the images of the double sight lines and the image of the single sight line having been formed by the projection lens and half-reflected by the half reflection mirror, on an image surface of the workpiece.

According to the above, an optical system with a simple structure can be constructed since double and single sight lines for the image sandwiching method are separated by a prism. An optical system of a simple structure, which can be easily adjusted, enables the focus detection unit to be compact. Also, focusing accuracy is improved due to the employment of a focus detection unit for the image sandwiching method to be compact.

(4) The microscope as defined in (2), may further comprise a third light source; a dark field mask comprising a light permissible film with light shielding at only the center part thereof, provided on an optical axis from the third light source; and a half reflection mirror for half-reflecting an image of the dark field mask toward the objective.

In this microscope light from the third light source is partly shielded at around the center part of the dark field mask and partly passes through around the center part thereof, and only light from the third light source having passed through the dark field mask is half-reflected by the half reflection mirror. This light reaches the image surface of the workpiece via the objective, whereby a dark field is formed in a bright field on the image surface of the detection object so that the images of double sight lines and the image of the single sight line are formed therein.

Thus, a dark field can be formed in the vicinity of the images of aiming double and single sight lines by using a third light source and a dark field mask so that contrast in brightness is enhanced between the line images and a workpiece. With enhanced contrast, focusing accuracy can be improved.

(5) This invention also includes a microscope including a focus detection unit for focusing by forming images of double sight lines and an image of an single sight line on an image surface of an optical system of a microscope, projecting the images onto a workpiece, and adjusting the images such that the image of the single sight line image is sandwiched by the image of the double sight lines.

This microscope comprises a first light source; a double slit mask provided on an optical axis of the first light source for forming the double sight lines; a second light source; a single slit mask provided on an optical axis of the second light source, for forming the single sight line; a prism shaped in a triangle pole having a first side surface and a second side surface together constituting an edge of a predetermined angle, and a plane opposing to the edge, for reflecting the double sight lines irradiating the first side surface and the single sight line irradiating the second side surface, toward a point before the edge; a projection lens provided before the edge of the prism, for forming the images of the double sight lines and the image of the single sight line so as to project the images onto the workpiece; a first half reflection mirror whose center part is a full reflection mirror, for reflecting in a direction of a predetermined angle, the images of the double and single sight lines formed by the projection lens; a second half reflection mirror for half-reflecting the images of the double single sight lines reflected by the first half reflection mirror; an objective for forming the images of the double sight lines and the image of the single sight line having been formed by the projection lens and half-reflected by the second half reflection mirror, on an image surface workpiece; and a third light source provided behind the first half reflection mirror.

In this microscope, light from the third light source partly passes through the first half reflection mirror, and only light from the third light source partly passed through the first half reflection mirror is half-reflected by the second half reflection mirror. This light reaches the image surface of the workpiece via the objective, thereby forming a dark field at a middle of a bright field on the image surface of the workpiece so that the images of the double sight lines and single sight lines are formed therein.

Thus, a dark field can be formed in the vicinity of the images of the double and single sight lines so that contrast in brightness is enhanced between the line images and a workpiece. With enhanced contrast, focusing accuracy can be improved.

(6) This invention also may be in the form of an automatic focusing device for a microscope comprising a focus detection unit as defined above in (1); a full reflection mirror for reflecting into a direction of a predetermined angle, the images of the double and single sight lines formed by the projection lens; a half reflection mirror for half-reflecting the images of the double and single sight lines reflected by the full reflection mirror; an objective for forming the images of the double sight lines and the image of the single sight line formed by the projection lens and half-reflected by the half reflection mirror, on an image surface of the workpiece; an image detection element situated at sight line imaging position opposite the objective with the half reflection mirror in-between; a judgement section for judging synchronicity of the images of the double sight lines and the image of the single sight line sandwiched by the images of the double sight lines detected by the image detection element; and a driving section for moving a pedestal for the workpiece in response to an output from the judgement section such that the image of the single sight line is sandwiched by the images of double sight lines.

According to the above, condition of the surface of a workpiece does not affect focusing accuracy of the automatic focusing device as much as in conventional automatic focusing devices using light emitting elements, since the double and single sight lines for the image sandwiching method are read by an image detection element, and whether or not the single sight line is sandwiched by the aiming double line is detected to study the focused state by referring to the images. Also, since double and single sight lines for the image sandwiching method are separated by a prism, the optical system can have a simple structure, which enables a compact automatic focusing device. Easy adjustment is an advantage of an optical system of a simple structure.

(7) An automatic focusing device of this invention may comprise the focus detection unit as defined in (1); a first half reflection mirror whose center part is a full reflection mirror, for reflecting at a predetermined angle, the images of the double sight lines and the image of the single sight line formed by the projection lens; a second half reflection mirror for half-reflecting the images of the double sight lines and the image of the single sight line reflected by the first half reflection mirror; an objective for forming the images of the double sight lines and the image of the single sight line formed by the projection lens and half-reflected by the second half reflection mirror on an image surface of the workpiece; an image detection element situated at a sight line imaging position opposing to the objective having the half reflection mirror in-between; a judgement section for judging synchronicity of the images of the double sight lines and the image of the single sight line sandwiched by the images of the double sight lines detected by the image detection element; a driving section for moving a pedestal for the workpiece such that the images of the single sight line is sandwiched by the images of the double sight lines, in response to an output from the judgement section; and a third light source provided behind the first half reflection mirror.

In this apparatus, light from the third light source partly passes through the fist half reflection mirror, and only that light from the third light source which has passed through the half reflection mirror is half-reflected by the second half reflection mirror to reach, via the objective, the image surface of the workpiece, and thereby form a dark field in a bright field on the image surface of the workpiece so that the images of the double sight lines and the image of the single sight line are formed therein.

Thus, a dark field can be formed around the images of the double and single sight lines so that contrast in brightness is enhanced between the line images and a workpiece. Focusing accuracy can be improved by enhance contract.

(8) The automatic focusing device for a microscope may be a device as outlined in (6), wherein the image detection element is a line sensor.

Since a line sensor can read images of aiming double and single lines at a high speed, processing for determining a focused state is scarcely delayed. Thus, determination of a focused state and automatic adjustment thereof can be performed substantially at real time bases.

(9) The automatic focusing device for a microscope may also be a device as described in (6), wherein the judgement section includes a memory for storing information regarding detected positions of the images of the double sight lines and the image of the single sight line, and studies a focused state by comparing a previously detected position and a currently detected position.

Thus, it is possible for a driving section to move a stage for a workpiece while understanding the position of the workpiece with respect to a focal point.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

While there will be described what are at present considered to be preferred embodiments of the invention, it will be understood that various modifications may be made thereto, and it is intended that the appended claims cover all such modifications as fall within the true spirit and scope of the invention.

Embodiment 1

Figure 1:
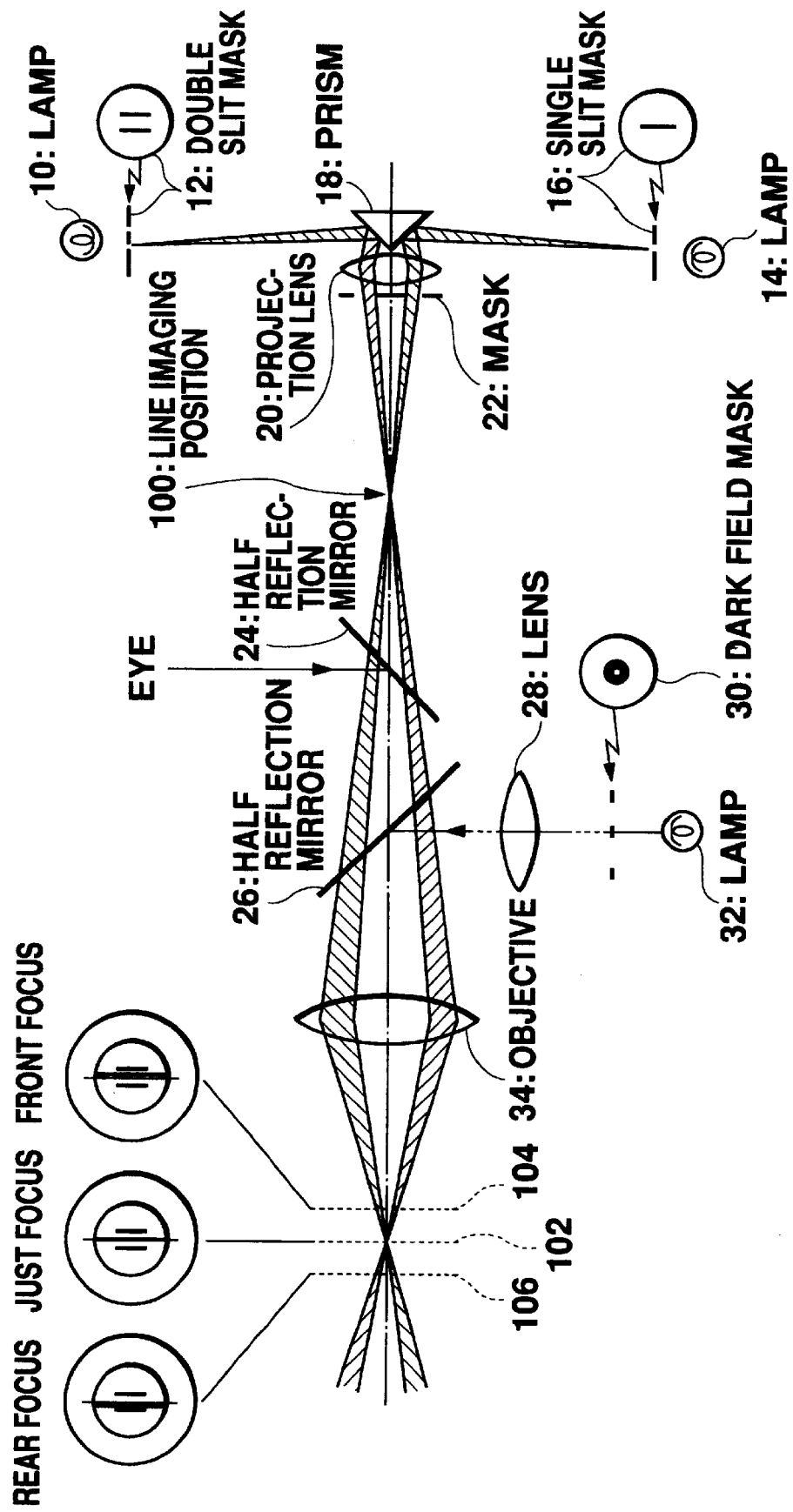
FIG. 1 is a diagram showing a structure focus detection unit according to the present invention.

Referring to FIG. 1, a focus detection unit of this invention will be described.

A focus detection unit of this embodiment performs a focusing operation by forming images of double and single sight lines on the image surface of the optical system of a microscope, projecting these images onto a workpiece, and adjusting the images such that the image of an single sight line is sandwiched by the images of the double sight lines. Such a focus detection unit comprises a lamp 10 as a first light source and a lamp 14 as a second lamp source. A double slit mask 12 is provided on the optical axis of the lamp 10 for forming double sight lines, while a single slit mask 16 is provided on the optical axis of the lamp 14 for forming a single sight line. The unit further comprises a prism 18, a projection lens 20, and a mask 22. The prism 18 has a triangular pole shape and consists of first and second side surfaces which together constitute an edge of a desired angle, and a plane opposing to the angle. The prism 18 is provided such that the double and single sight lines are able to irradiate the respective first and second side surfaces thereof, and such that the prism reflects the irradiating light towards an area before its edge. The light from the prism 18 passes through the projection lens 20, provided before the edge of the prism 18, and is thereby converged into images at a sight line imaging position 100 after passing through and being separated by mask 22. The images are further projected onto the workpiece.

When a microscope including the above focus detection unit is used, the single sight line is shown being sandwiched by the double sight lines when the microscope is properly focused, i.e., at an exact focus position 102. However, if an object is located beyond than the focal point, i.e., at a front focus position 104, or nearer, i.e., at a rear focus position 106, the single sight line is shown closer to one of the double sight lines. With the image sandwiching method, highly accurate focusing is each of separate naked eye because of separate angle recognition with accuracy of ±5 seconds and +6.5 μm.

As described above, according to this embodiment, there can be provided a compact focus detection unit employing an image sandwiching method because since an optical system for the image sandwiching method can be constructed having a simpler structure as compared to conventional methods, because the aiming double and single lines are separated by a prism 18. Easy adjustment is an advantage of an optical system of a simple structure. Further, focusing accuracy of a conventional microscope can be improved merely by attaching the focus detection unit of this embodiment to a conventional microscope at the middle image position (i.e., a sight line imaging position 100 in FIG. 1).

It should be noted that a light source is not limited to a lamp (i.e., an incandescent lamp), as is used in this embodiment, and an LED or other light source may be used. This applies also to the following embodiments.

In addition, a focus detection unit of this embodiment may be connected not only to a TV port of a microscope, but also to any device including an optical system for a focusing operation.

Embodiment 2

This embodiment relates to a microscope including the focus detection unit of the first embodiment. Elements corresponding to those in the first embodiment are given the same reference numeral and their explanation is not repeated.

In addition to the focus detection unit of the first embodiment, a microscope of this embodiment includes an objective 34, a lamp 32 as a third light source, a dark field mask 30, and a half reflection mirror 26. The objective 34 is provided for forming images of double and single sight lines (which have been projected by the projection lens 20) on the image surface of a workpiece. The dark field mask 30, provided on the optical axis of the lamp 32, comprises a light transmissible film with light shielding at only its center portion. Light from the lamp 32 is partly shielded by the mask 30 at the center part, while the rest passes through around that center area. Only the light having passed through the mask 30 is half-reflected by the half reflection mirror 26 to reach, via the objective 34, the image surface of a workpiece. As a result, a dark field can be formed at the middle of a bright field on the image surface of the workpiece so that sight line images are formed therein.

Also, another half reflection mirror 24 is provided between the half reflection mirror 26 and the sight line imaging position 100 to half-reflect the image of a workpiece. The half-reflected image can be observed by naked eye via an ocular (not shown).

Figure 2:
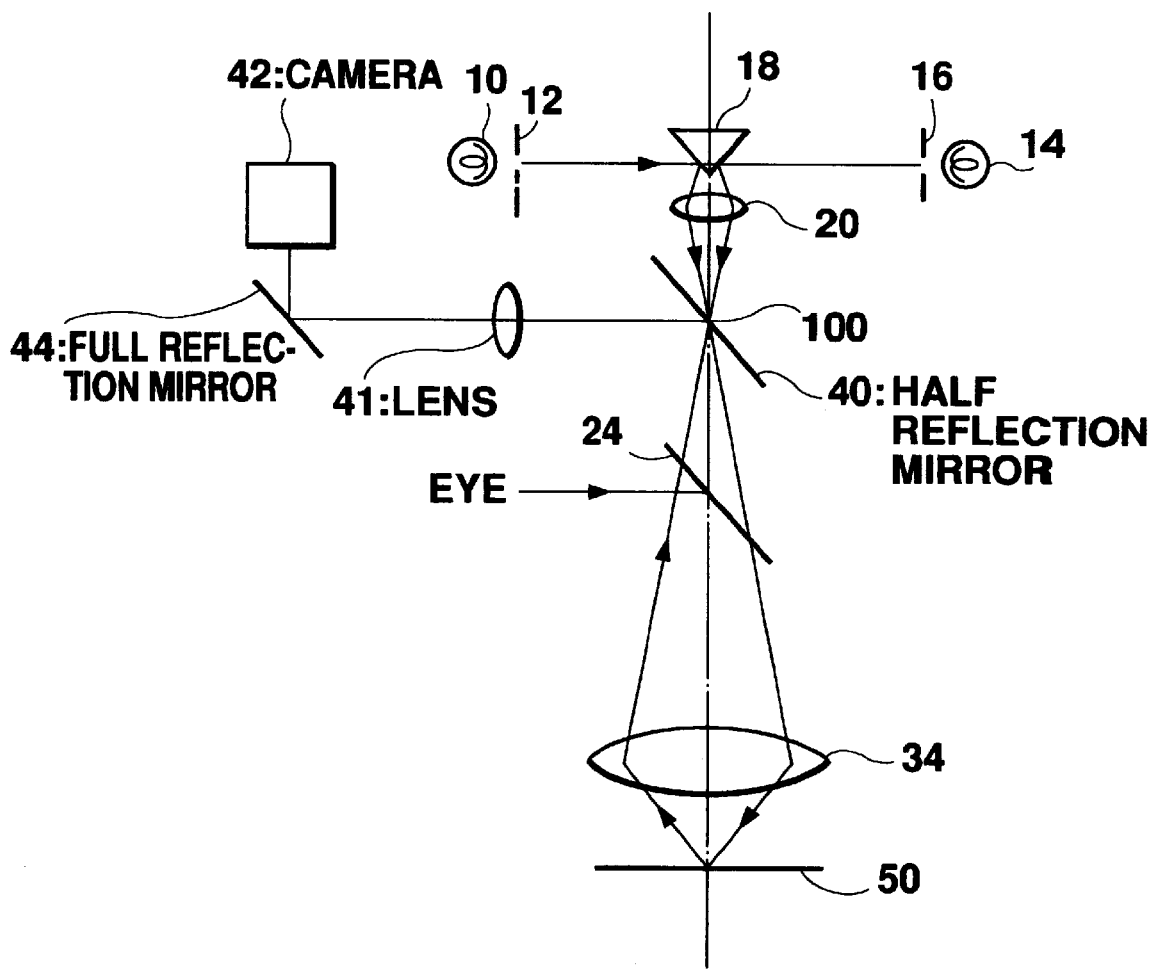
FIG. 2 is a diagram showing a structure of a microscope having a focus detection unit according to the present invention and a TV port connected thereto.

When another half reflection mirror 40 is provided in the vicinity of the sight line imaging position 100, and a lens 41 and a full reflection mirror 44 are also installed as shown in FIG. 2, the image of a workpiece 50 is half-reflected by the mirror 40 and further reflected by the mirror 44 after passing through the lens 41, so that the image can be observed through and photographed by a camera 42. Alternatively, if a TV camera is connected in place of the camera 42, the image of a workpiece 50 can be observed both by naked eye and through a TV camera.

Embodiment 3

Figure 3:
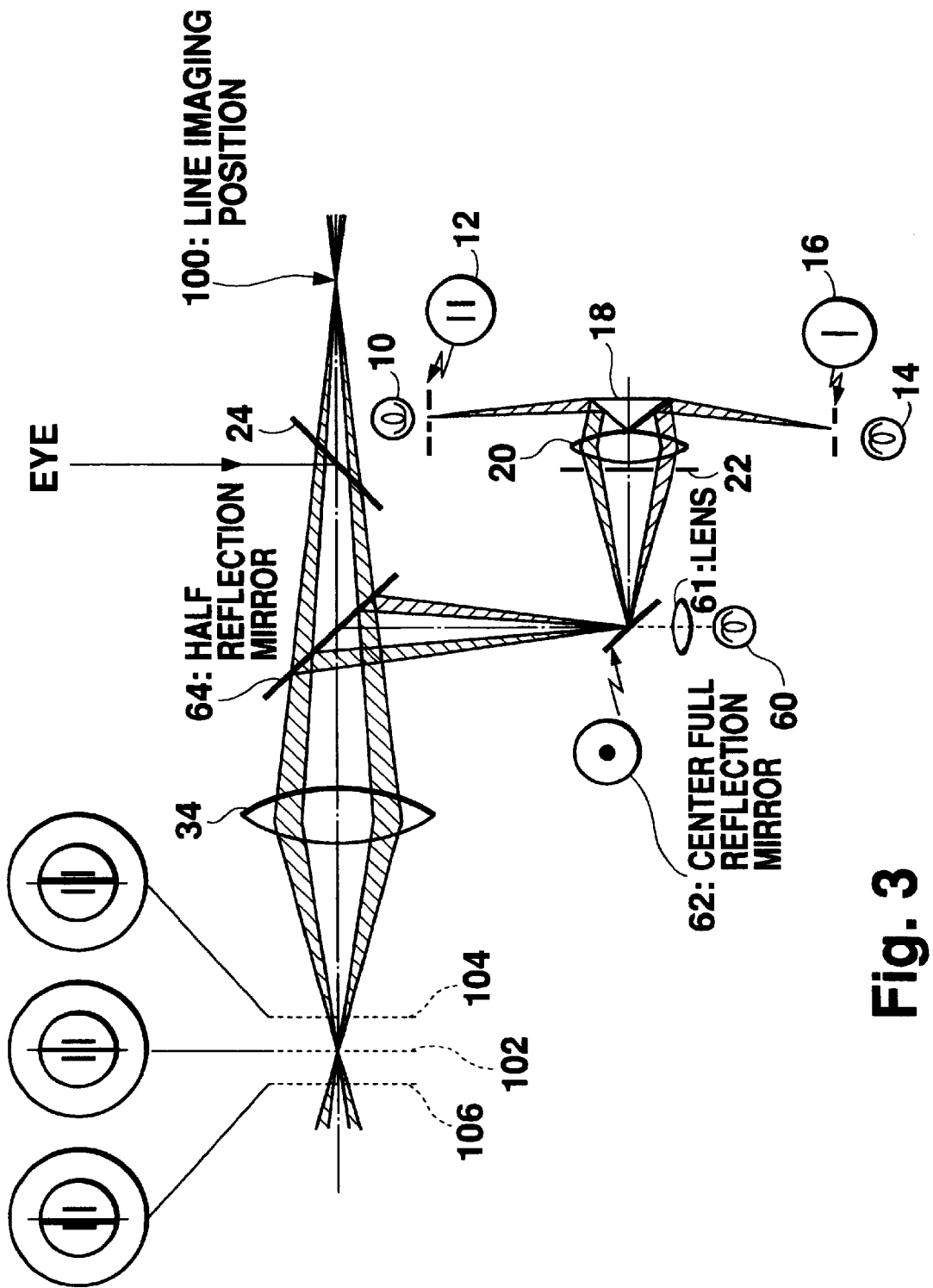
FIG. 3 is a diagram showing another structure of a microscope having a focus detection unit according to the present invention.
Figure 4:
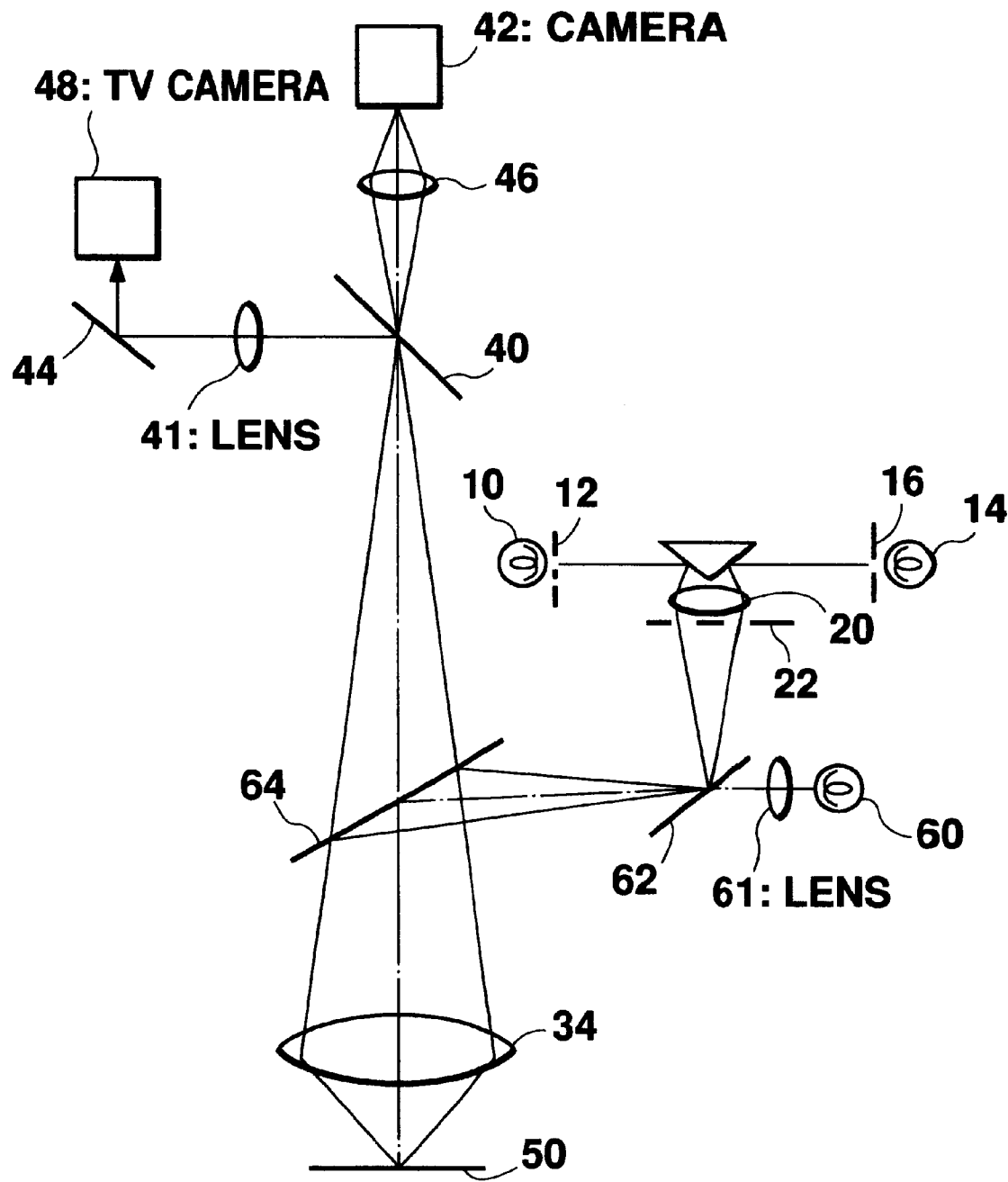
FIG. 4 is a diagram showing a structure of the microscope shown in FIG. 3 having a TV port and a camera port connected thereto.

A microscope of this embodiment includes a focus detection unit which performs a focusing operation by forming images of double and single sight lines on the image surface of the optical system of a microscope, projecting them onto a workpiece, and adjusting them such that the image of a single sight line is sandwiched by images of double sight lines, and has a structure shown as in FIG. 3 or 4. Elements corresponding to those of the first or second embodiments are given the same reference numeral and their explanation is not repeated.

Specifically, as shown in FIG. 3, the microscope comprises a lamp 10 as a first light source and a lamp 14 as a second light source. A double slit mask 12 is provided on the optical axis of the lamp 10 for forming a double sight line, while a single slit mask 16 is provided on the optical axis of the lamp 14 for forming a single sight line. The unit further comprises a prism 18, a projection lens 20, and a mask 22. The prism 18 has a triangular pole shape and consists of first and second side surfaces which together constitute an edge of a desired angle, and a plane opposing to the angle. The prism 18 is provided such that light for the double and single sight lines can irradiate the respective first and second side surfaces thereof, and reflects the irradiating light towards an area before its edge. The light from the prism 18 passes through the projection lens 20, provided before the edge of the prism 18, and is converged into images at a sight line imaging position 100 after passing through and being separated by the mask. The images are projected onto the workpiece.

In addition to the above focus detection unit, the microscope further comprises half reflection mirrors 62, 64, and an objective 34. The half reflection mirror 62, whose center part is a full reflection mirror, reflects the images of the both aiming lines (which have been projected by the projection lens 20 at a predetermined angle. The reflected light is further half-reflected by the half reflection mirror 64 toward the objective 34. Receiving the further reflected light, the objective 34 forms images of the double and single sight lines projected by the projection lens 20 on the image surface of a workpiece.

According to a microscope of this embodiment, a compact focus detection unit for the image sandwiching method can be constructed, including an optical system of a simpler structure, which is possible due to the employment of a prism 18 for separating double and single sight lines. Adjustment is easier and such a microscope has improved focusing accuracy as it incorporates a focus detection unit employing the image sandwiching method.

In addition to the above structure, a lamp 60 as a third light source and a lens 61 are also provided behind the half reflection mirror 62. Light from the lamp 60 converged by the lens 62 partly passes through the half reflection mirror 62, whose center part is a full reflection mirror. Only that light having passed through the mirror 62 is half-reflected by the half reflection mirror 64 to reach, via the objective 34, the image surface of a workpiece. As a result, a dark field can be formed at the middle of a bright field on the image surface of the workpiece so that images of the sight lines are formed therein.

Another half reflection mirror 24 is also provided between the half reflection mirror 64 and the sight line imaging position 100 to half-reflect the image of a workpiece. The half-reflected image can be observed by naked eye via an ocular (not shown).

When another half reflection mirror 40 is provided at the sight line imaging position 100, and a lens 41 and a full reflection mirror 44 are also installed as shown in FIG. 4, the image of a workpiece 50 is half-reflected by the mirror 40 and further reflected by the mirror 44 after passing through the lens 41 so that it can be observed through a TV camera 48. Moreover, in this embodiment, the image of a workpiece partly passes through the half reflection mirror 40 and is converged via lens 46, since the focus detection unit is not situated on the extending line from the both aiming line imaging position 100. The image can be observed through or photographed by a camera 42. The image of the workpiece can therefore be photographed under TV observation.

As described above, according to this invention, there can be provided a compact focus detection unit employing an image sandwiching method since an optical system can be constructed having a simple structure due to the employment of a prism for separating double and single sight lines. Adjustment is made easier is such an optical system of a simple structure. Further, improved focusing accuracy can be achieved with a general microscope when the above focus detection unit is attached where a TV port is located (i.e., retro-fit). In other words, a conventional microscope is able to perform highly accurate focusing after attachment of only the focus detection unit. This is provides an important economic advantage.

Also, according to a microscope of this invention, improved focusing accuracy can be achieved, as the microscope employs the image sandwiching method capable of high detection capability. Further, the use of a prism as mentioned above enables simplifying the structure of an optical system. An optical system of a simple structure can be easily adjusted. Furthermore, as a dark field is formed in the vicinity of the images of the double and single sight lines as a result of combining a light source and either a dark field mask or a center cull reflection mirror, contrast in brightness between line images and a workpiece can be enhanced, which contributes to improved focusing accuracy.

Embodiment 4

An automatic focusing device for a microscope of this embodiment will next be described referring to FIG. 5.

According to this embodiment, there is provided an automatic focusing device which performs a focusing operation by forming images of the double and single sight lines on the image surface of the optical system of the microscope, projecting them onto a workpiece, and adjusting them such that the single sight line is sandwiched by the double sight lines. Such an automatic focusing device has a structure as shown in FIG. 5.

Specifically, this automatic focusing device comprises a lamp 10 as a first light source and a lamp 14 as a second light source. A double slit mask 12 is provided on the optical axis of the lamp 10 for forming double sight lines, while a single slit mask 16 is provided on the optical axis of the lamp 14 for forming a single sight line. The unit further comprises a prism 18, a projection lens 20, and a mask 22. The prism 18 has a triangular pole shape and consists of first and second side surfaces which together constitute an edge of a desired angle, and a plane opposite to that angle. The prism 18 is provided such that light for the double and single sight lines can irradiate the first and second side surfaces thereof, and the prism reflects the irradiating light towards an area before its edge. The light from the prism 18 passes through the projection lens 20, provided before the edge of the prism 18, and is thereby converged into images at a sight line imaging position 100 after passing through and being separated by mask 22. The images are projected onto the workpiece.

The automatic focusing device of this embodiment further comprises half reflection mirrors 26, 30 and a projection lens 34. The half reflection mirror 30, whose center is a full reflection mirror, half-reflects the images of the sight lines formed by the projection lens 20 at a predetermined angle. The reflected light is further half-reflected by the half reflection mirror 26 towards the objective 34. The objective 34 forms images of double and single sight lines on the image surface of a workpiece.

This device also comprises an image detection element 40, a judgement circuit 42, a driving circuit 46, a driving mechanism 48, and a pedestal 50. Specifically, the image detection element 40, situated at the sight line imaging position, i.e., a middle image position, which is on the opposite side of the objective 34 with the half reflection mirror 26 located in-between, detects synchronicity of double and single sight lines. The judgement circuit 42 judges the synchronicity of the images detected. In response to an output from the judgement circuit 42, the driving circuit 46 drives the driving mechanism 48 (e.g., a stepping motor) so as to vertically move the pedestal 50 for a workpiece so that the image of the single sight line is brought into the middle between the images of the double sight lines. The image detection element of this embodiment may comprise a line sensor, a position sensitive device (PSD), a CCD camera, or the like. A line sensor, in particular, may be effective as it is capable of high speed reading and causes little delay in a focusing operation.

According to an automatic focusing device for a microscope of this embodiment, focusing accuracy is less affected by the condition of the surface of a workpiece than is a conventional automatic focusing device using light emitting elements, since double and single sight lines for the image sandwiching method are read by an image detection element 40. Also, since double and single sight lines for the image sandwiching method are separated by the prism 18, the optical system can have a simple structure, which accordingly enables a compact focusing element. Easy adjustment is an advantage of an optical system with a simple structure. Further, improved focusing accuracy is obtained by employing an image sandwiching method for focusing.

A lamp 28 as a third light source and a lens 29 are also provided behind the half reflection mirror 30. Light from the lamp 28 is first converged by a lens 29 and then partly passes through the half reflection mirror 30, whose center portion is a full reflection mirror. Only that light having passed through the half reflection mirror 30 is half-reflected by the half reflection mirror 26 to reach, via the objective 34, the image surface of the workpiece 52. As a result, a dark field can be formed at the middle of a bright field on the image surface of the workpiece 52 so that the sight aiming lines are formed therein.

Further, another half reflection mirror 24 is provided between the half reflection mirror 26 and the image detection element 40 to half-reflect the image of a workpiece. The reflected image of a workpiece can be observed via an ocular (not shown) by naked eye.

As described above, according to an automatic focusing device for a microscope of this embodiment, a focused state can be observed by naked eye while it is being automatically adjusted.

A judgement circuit 42 will next be described in detail referring to FIGS. 5 to 8.

Figure 6:
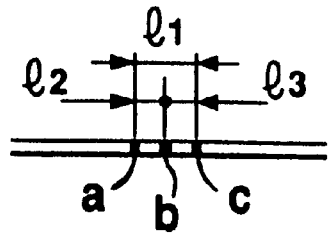
FIG. 6 is a diagram showing a focused state read by an image detection element of an automatic focusing device for a microscope according to the present invention.
Figure 7:
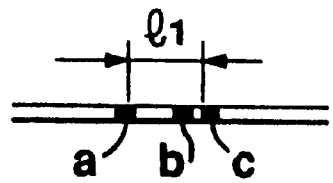
FIG. 7 is a diagram showing a out-of-focused state read by an image detection element of an automatic focusing device for a microscope according to the present invention.
Figure 8:
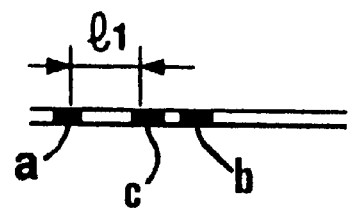
FIG. 8 is a diagram showing another out-of-focused state read by an image detection element of an automatic focusing device for a microscope according to the present invention.
Figure 9:
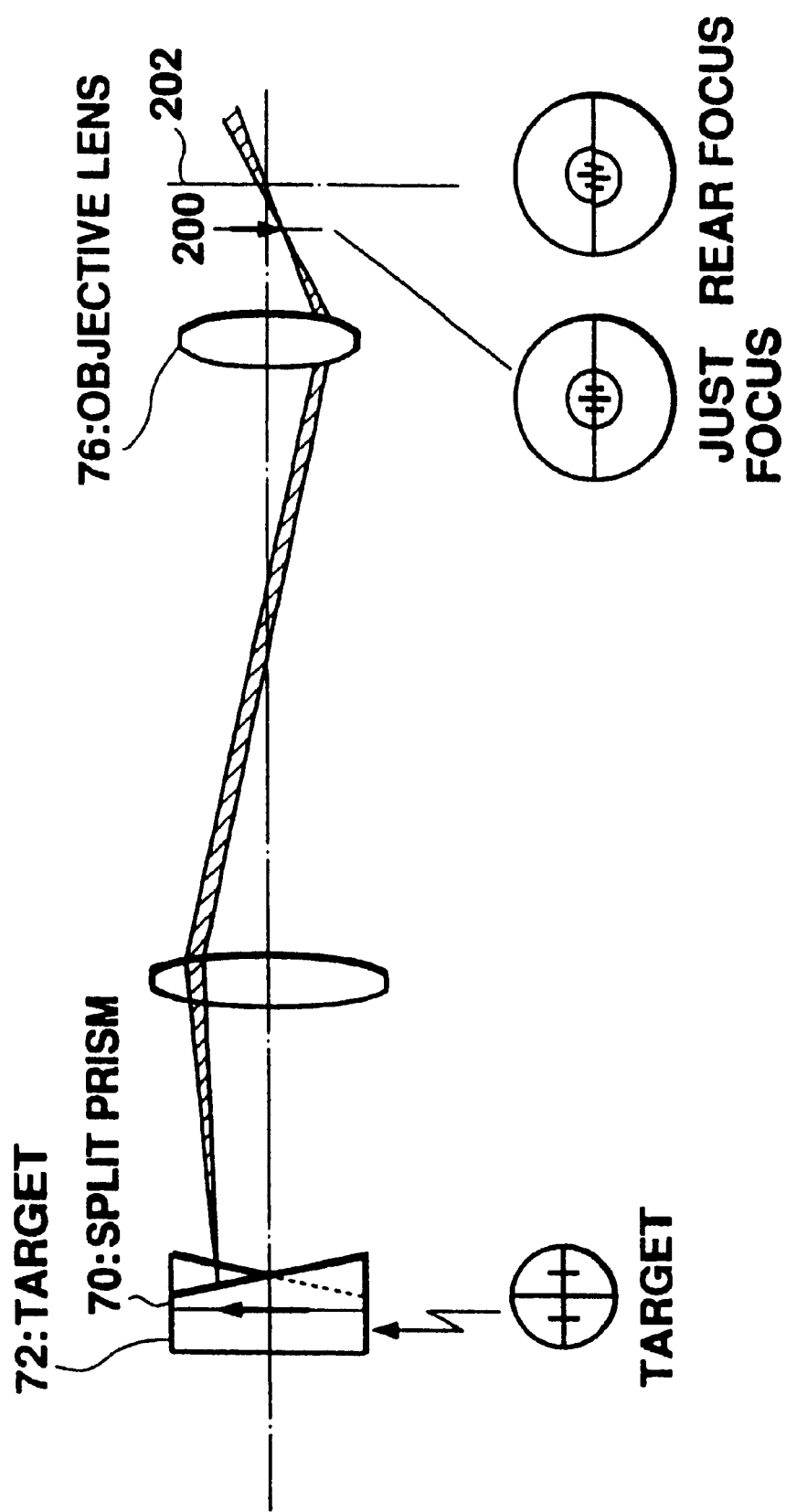
FIG. 9 is a diagram explaining the principle of an image split method using a split prism.
Figure 10:
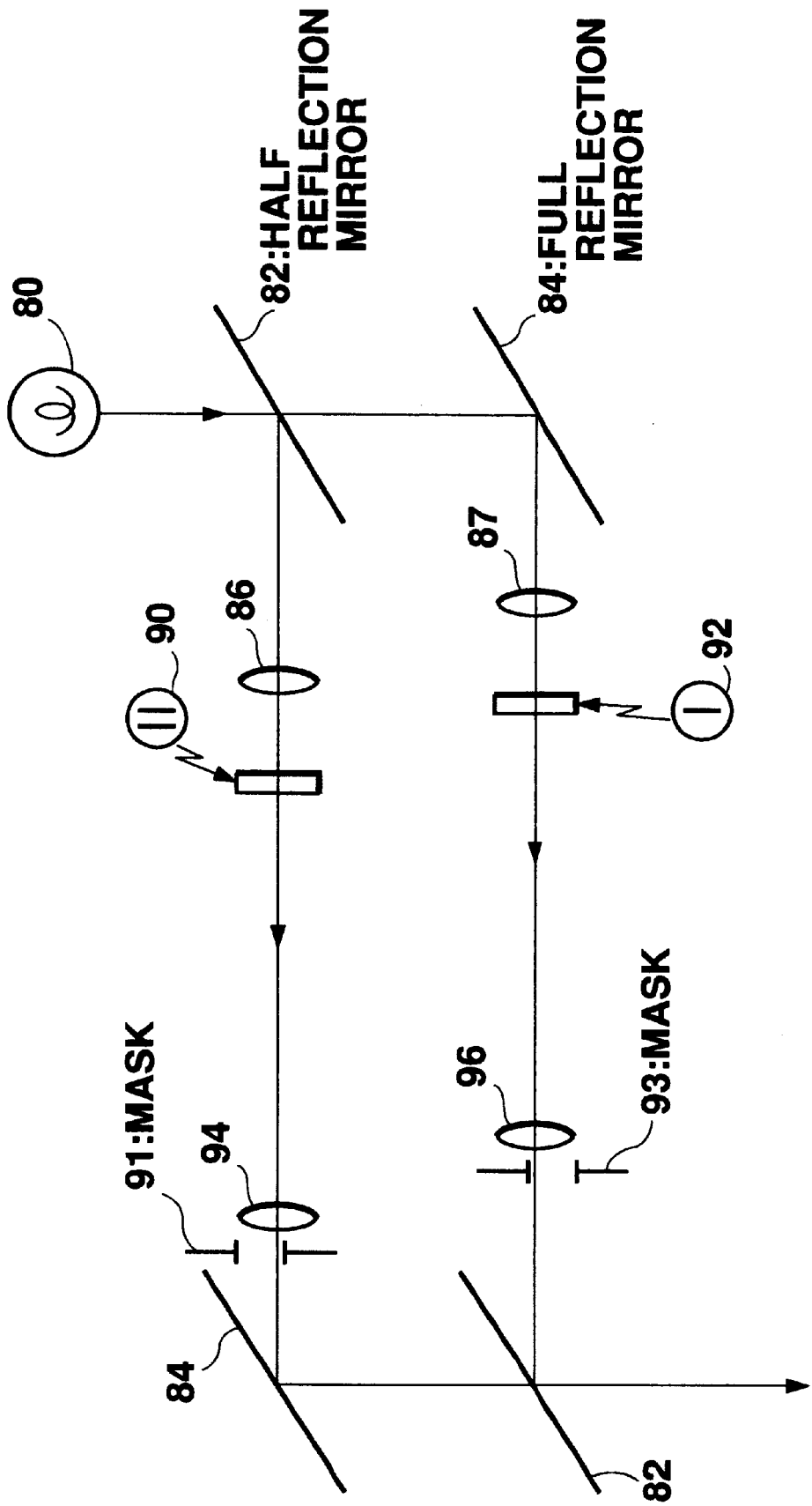
FIG. 10 is a diagram showing a structure of a conventional optical system for a focus detection unit employing an image sandwiching method.

When focus is properly adjusted, the single sight line b appears to be sandwiched by the double sight lines a, c, as shown in FIG. 6. However, as the focus is being displaced, the single sight line b appears to move, for instance, rightward, while the double sight lines a and c appear to move to the left (or vice versa depending on the displaced direction of a focal point), until the single sight line b transcends the double sight line a or c, as shown in FIG. 8. In view of the above, information $1_1$ concerning the interval between double sight lines a, c, namely is inputted beforehand into the judgement circuit 42. Referring to this information, the judgement circuit 42 can discriminate the single sight line b and double sight lines a, c, among the three lines read by the image detection element 40, and finally can determine a focused state based on the positional relationship of the three lines.

Figure 5:
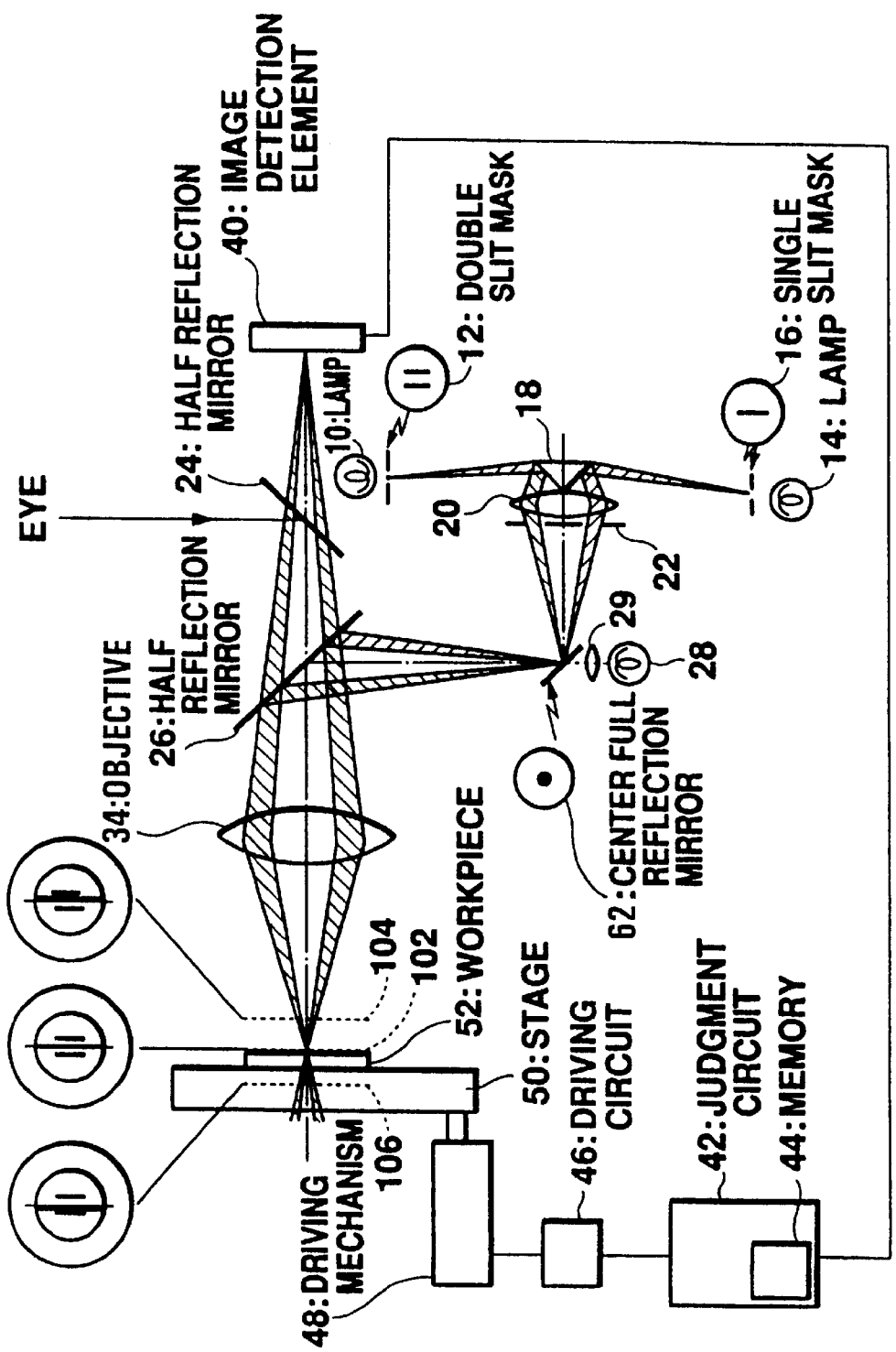
FIG. 5 is a diagram showing a structure of an automatic focusing device for a microscope according to the present invention.

When a microscope is properly focused with respect to a workpiece 52, i.e., at an exact focus position 102 in FIG. 5, the single sight line b is seen sandwiched between the double sight lines a and c. In this case, the image detection element 40 detects an equal interval between the lines a and b, and b and c (see FIG. 6), so that the judgement circuit 42 recognizes a focused state when $1_2=1_3$. The judgement circuit 42 then outputs a zero-level signal indicating a focused state to the driving circuit 46.

On the other hand, when a focal point is nearer than a workpiece 52, i.e., a front focus 104 in FIG. 5, the interval between the lines a and b is larger than that between the lines b and c. The judgement circuit 42 then outputs a positive driving signal to the driving circuit 46. In response to this signal, the driving mechanism 48 moves the stage 50 downward. With a rear focus 106, since the interval between the lines a and b is shorter than that between the lines b and c, the judgement circuit 42 outputs a negative driving signal to the driving circuit 46 so that the driving mechanism 48 moves the stage 50 upward. The extent of vertical movement is in proportion to the absolute value of the difference in the intervals between the lines a and b, and b and c.

The judgement circuit 42 of this embodiment comprises a memory 44, such as a RAM, for storing information regarding detected positions of the sight lines so that the judgement circuit 42 can understand variation of a focused state through comparison between previously and presently detected positions of the sight lines a, b, and c.

With the above arrangement, it is possible to vertically move a pedestal for a workpiece by a driving section while being aware of the position of a workpiece with respect to a focal point.

It should also be noted again that a light source is not limited to a lamp, such as an incandescent lamp, but may be an LED or other light source instead.

As described above, according to an automatic focusing device for a microscope of this invention, focusing accuracy is less affected by the condition of the surface of a workpiece as are conventional automatic focusing devices using a light emitting element, since double and single sight lines for an image sandwiching method are read by an image detection element in order to determine a focused state. Also, since the double and single sight lines for the image sandwiching method are separated by a prism, an optical system can have a simple structure, which accordingly enables construction of a compact automatic focusing device. An optical system with a simple structure can also be adjusted easily.

Furthermore, as a dark field is formed where the images of the double and single sight lines are formed by combining a light source and either a dark field mask or a full reflection mirror, contrast in brightness between the line images and a workpiece is enhanced, which contributes to improving focusing operations.

Furthermore, it is possible to move a stage for a workpiece by a driving section while being aware of the position of the workpiece with respect to a focal point, since the judgement section has a memory for storing information regarding the detected positions of the sight lines, and judges variation of a focused state through comparison between previously and presently detected positions.

What is claimed is:

1. A focus detection unit for focusing by forming images of double sight lines and an image of a single sight line on an image surface of an optical system of a microscope, projecting the images onto a workpiece, and adjusting the images such that the image of the single sight line is sandwiched by the images of the double sight lines, comprising:

a first light source;

a double slit mask provided on an optical axis of the first light source, for forming the double sight lines;

a second light source;

a single slit mask provided on an optical axis of the second light source, for forming the single sight line;

a triangular pole shaped prism having a first side surface and a second side surface together constituting an edge of a predetermined angle, and a plane opposing to the edge, for reflecting the double sight lines irradiating the first side surface and the single sight line irradiating the second side surface, toward an area before the edge, and a projection lens provided before the edge of the prism, for projecting the images of the double sight lines and the image of the single sight line onto the workpiece.

2. An automatic focusing device for a microscope, comprising a focus detection unit as defined in claim 1;

a center full reflection mirror for reflecting into a direction of a predetermined angle images of the double sight lines and single sight line formed by the projection lens;

a half reflection mirror for half-reflecting the images of the double sight lines and single sight line reflected by the full reflection mirror;

an objective for reforming on an image surface of the workpiece the images of the double sight lines and the single sight line and half-reflected by the half reflection mirror;

an image detection element situated at a sight line imaging position opposite to the objective with the half reflection mirror located in-between;

a judgement section for judging a synchronicity of the images of the double sight lines and the image of the single sight line sandwiched by the images of the double sight lines detected by a image detection element; and a driving section for vertically moving a stage for the workpiece in response to an output from the judgement section such that the image of the single sight line is sandwiched by the images of the double sight lines.

3. The automatic focusing device for a microscope as defined in claim 2, wherein the image detection element is a line sensor.

4. The automatic focusing device for a microscope as defined in claim 2, wherein the judgement section includes a memory for storing information regarding detected positions of the images of the double sight lines and the image of the single sight line, and the judgement section studies a focused state by comparing a previously detected position and a currently detected position.

5. An automatic focusing device for a microscope comprising:

a focus detection unit as defined in claim 1;

a first half reflection mirror whose center area is a full reflection mirror, for reflecting at a predetermined angle, the images of the double sight lines and the image of the single sight line formed by the projection lens;

a second half reflection mirror for half-reflecting the images of the double sight lines and the image of the single sight line reflected by the first half reflection mirror;

an objective for forming the images of the double sight lines and the image of the single sight line formed by the projection lens and half-reflected by the second half reflection mirror, on an image surface of the workpiece;

an image detection element situated at a sight line imaging position opposite to the objective with the half reflection mirror located in-between;

a judgement section for judging the synchronicity of the images of the double sight lines and the image of the single sight line sandwiched by the images of the double sight lines detected by the image detection element;

a driving section for moving a stage for the workpiece in response to an output from the judgement section such that the images of the single sight line is sandwiched in the center of the images of the double sight lines; and a third light source provided behind the first half reflection mirror;

wherein light from the third light source partly passes through the first half reflection mirror, only that light from the third light source which has passed through the half reflection mirror is half-reflected by the second half reflection mirror to reach, via the objective, the image surface of the workpiece, and a dark field is formed in a bright field on the image surface of the workpiece so that the images of the double sight lines and the image of the single sight line are formed therein.

6. A microscope comprising:

a focus detection unit as defined in claim 1; and an objective for forming the images of the double sight lines and the image of the single sight line having been formed by the projection lens, on an image surface of the workpiece.

7. The microscope as defined in claim 6, further comprising:

a third light source;

a dark field mask comprising a light permissible film portion with a light shielding portion at only the center area thereof, provided on an optical axis of the third light source; and a half reflection mirror for half-reflecting an image of the dark field mask toward the objective, wherein only a portion of the light from the third light source is blocked by the light shielding portion of the dark field mask and a portion passes therethrough said light permissible portion, only that light from the third light source having passed through the dark field mask is half-reflected by the half reflection mirror to reach, via the objective, the image surface of the workpiece, and a dark field is formed in a bright field on the image surface of the workpiece so that the images of the double sight lines and the image of the single sight line are formed therein.

8. The microscope as defined in claim 7, wherein the predetermined angle is a right angle.

9. The focus detection unit as defined in claim 1, wherein the predetermined angle is a right angle.

10. A microscope including a focus detection unit for focusing by forming images of double sight lines and an image of a single sight line on an image surface of an optical system of a microscope, projecting the images onto a workpiece, and adjusting the images such that the image of the single sight line image is sandwiched by the image of the double sight lines, comprising:

a first light source;

a double slit mask provided on an optical axis of the first light source, for forming the double sight lines;

a second light source;

a single slit mask provided on an optical axis of the second light source, for forming the single sight line;

a triangular pole shaped prism having a first side surface and a second side surface together constituting an edge of a predetermined angle, and a plane opposing to the edge, for reflecting the double sight lines irradiating the first side surface and the single sight line irradiating the second side surface, toward an area before the edge, and a projection lens provided before the edge of the prism, for projecting the images of the double sight lines and the image of the single sight line onto the workpiece;

a full reflection mirror for reflecting at a predetermined angle the images of the double sight lines and the image of the single sight line formed by the projection lens;

a half reflection mirror for half-reflecting the images of the double sight lines and the image of the single sight line reflected by the full reflection mirror; and an objective for forming the images of the double sight lines and the image of the single sight line formed by the projection lens and half-reflected by the half reflection mirror, on an image surface of the workpiece.

11. The microscope as defined in claims 10, wherein the predetermined angle is a right angle.

12. A microscope including a focus detection unit for focusing by forming images of double sight lines and an image of a single sight line on an image surface of an optical system of a microscope, projecting the images onto a workpiece, and adjusting the images such that the image of the single sight line image is sandwiched by the image of the double sight lines, comprising:

- a first light source;
- a double slit mask provided on an optical axis of the first light source, for forming the double sight lines;
- a second light source;
- a single slit mask provided on an optical axis of the second light source, for forming the single sight line;
- a triangular pole shaped prism having a first side surface and a second side surface together constituting an edge of a predetermined angle, and a plane opposing to the edge, for reflecting the double sight lines irradiating the first side surface and the single sight line irradiating the second side surface, toward an area before the edge; and
- a projection lens provided before the edge of the prism, for projecting the images of the double sight lines and the image of the single sight line onto the workpiece;
- a first half reflection mirror whose center area is a full reflection mirror, for reflecting at predetermined angle, the images of the double sight lines and the image of the single sight line formed by the projection lens;
- a second half reflection mirror for half-reflecting the images of the double sight lines and the image of the single sight line reflected by the first half reflection mirror;
- an objective for forming the images of the double sight lines and the image of the single sight line formed by the projection lens and half-reflected by the second half reflection mirror, on an image surface of the workpiece;
- a third light source provided behind the first half reflection mirror;

wherein light from the third light source partly passes through the first half reflection mirror, only that light from the third light source that has passed through the first half reflection mirror to be half-reflected by the second half reflection mirror and to reach, via the objective, to the image surface of the workpiece, and a dark field is formed at a middle of a bright field on the image surface of the workpiece so that the images of the double sight lines and the image of the single sight line are formed therein.

* * * * *